May 19, 1942.  A. R. BONORDEN  2,283,410

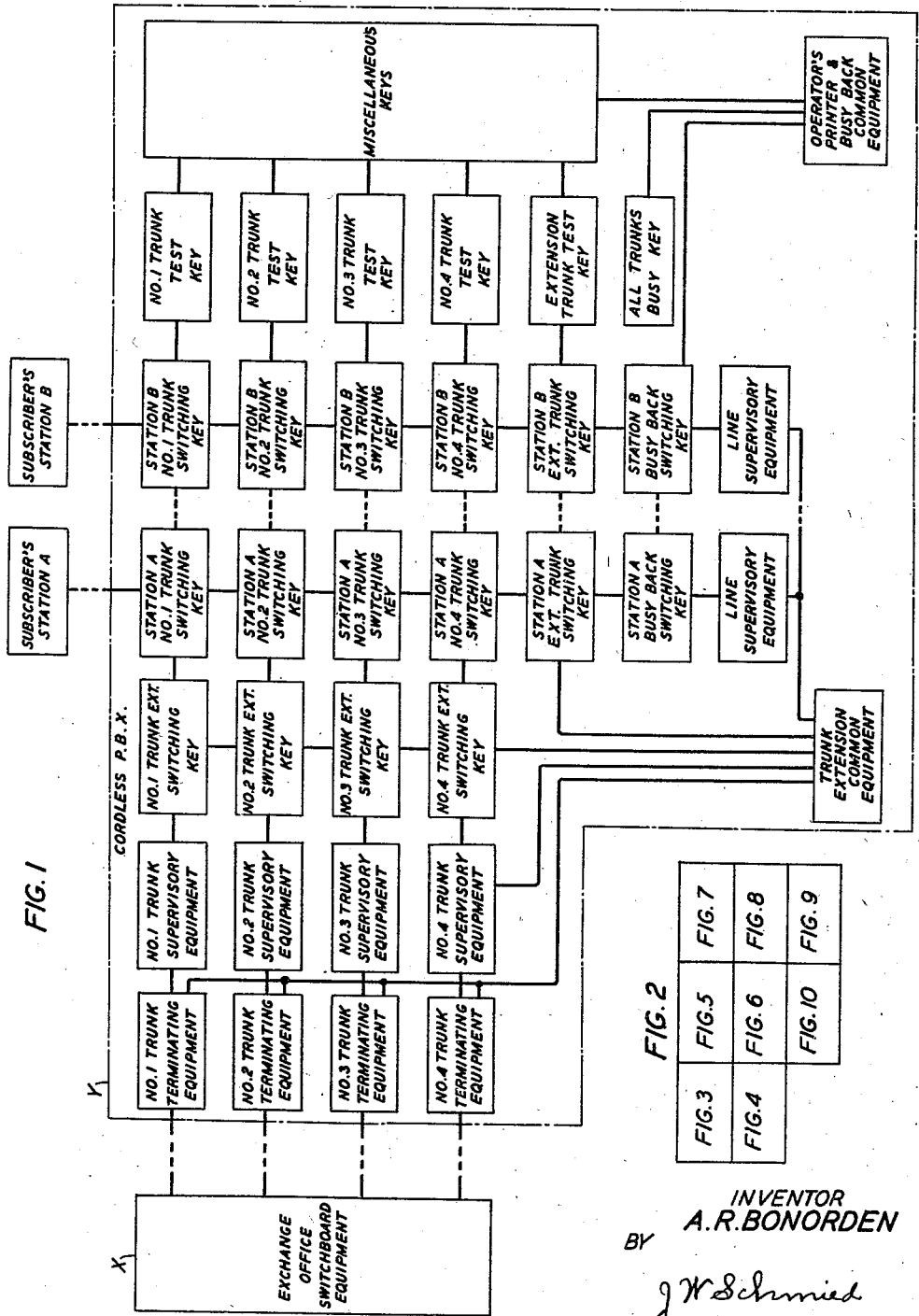

TELETYPEWRITER EXCHANGE SYSTEM

Filed Dec. 1, 1939  9 Sheets-Sheet 2

INVENTOR
A.R. BONORDEN
BY
J. W. Schmied
ATTORNEY

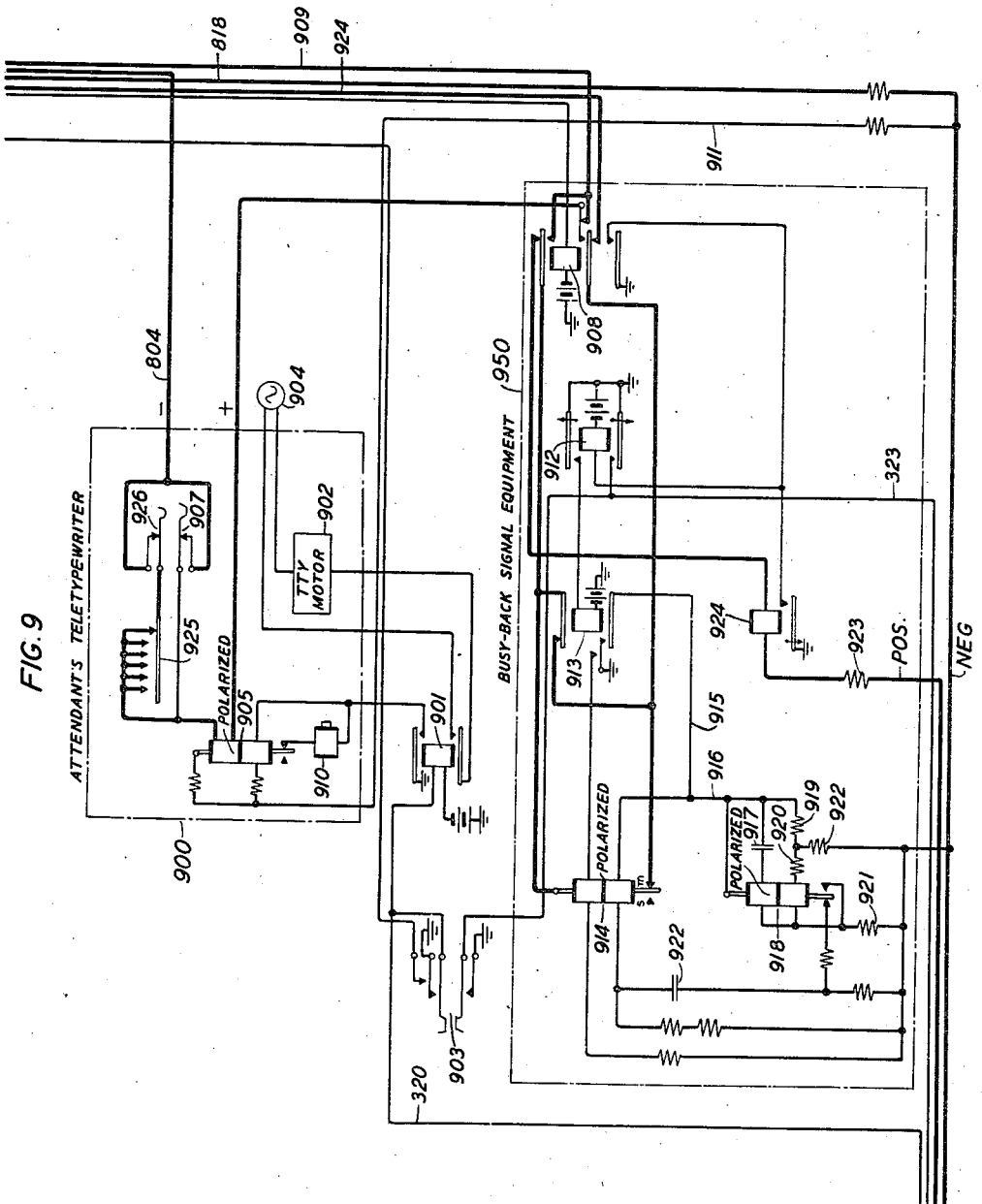

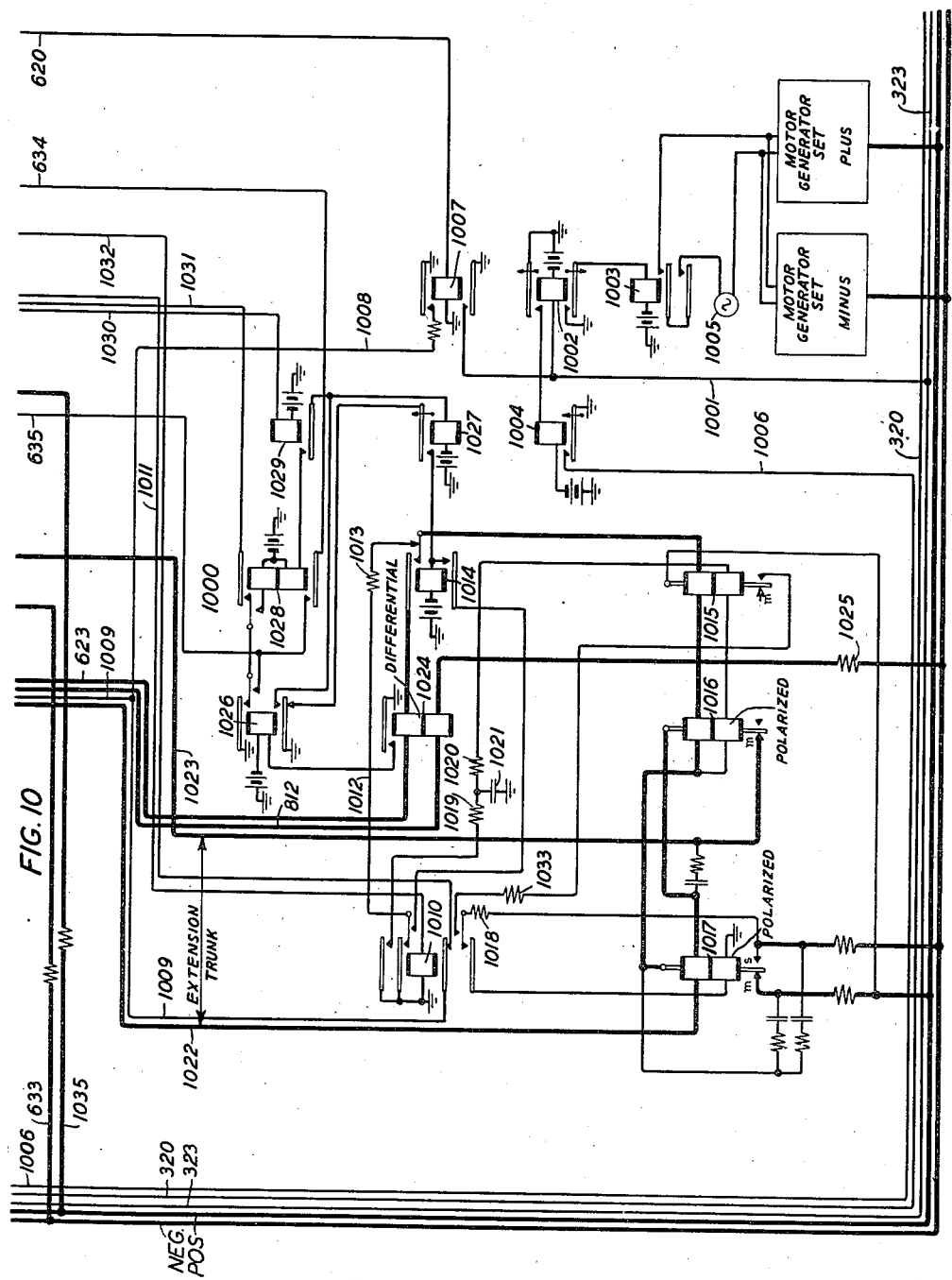

Patented May 19, 1942

2,283,410

UNITED STATES PATENT OFFICE 2,283,410

TELETYPEWRITER EXCHANGE SYSTEM

Allen R. Bonorden, Plainfield, N. J., assignor to Bell Telephone Laboratories, Incorporated, New York, N. Y., a corporation of New York Application December 1, 1939, Serial No. 307,028

7 Claims. (Cl. 178—2)

This invention relates to a satellite switching center constituting a part of a teletypewriter or printing telegraph exchange system.

It is particularly adapted for use in an area where a number of teletypewriter subscriber stations are located and wherein the traffic and number of subscribers does not warrant an exchange or central office, for the reason that to keep an exchange, or central office, with the usual operating personnel would not be economically justifiable. The alternative method of extending individual subscriber's lines with toll or long line equipments from the exchange, or central office, directly to the subscribers' stations would likewise not be economically justifiable.

In accordance with the present invention a silent switching point, or center, is established to provide service to the subscribers in the area in question over a relatively small number of trunks extending to one or more of the nearest central offices. In this way a small number of trunks will provide, with little or no delay, adequate service to a larger number of subscribers' stations. The connections between the trunks and the subscribers' lines are completed by means of keys at a cordless switchboard located at the switching center. The number of trunks and subscribers' lines furnished in this system depend on the number of subscribers' stations in an isolated area and the capacity of the cordless switchboard.

The system herein involves:

(1) A teletypewriter exchange, or central, office and a teletypewriter exchange switchboard;

(2) A satellite office equipped with a teletypewriter cordless switchboard;

(3) Subscribers' stations.

The usual maintenance or testing man or men at the satellite office may perform the necessary switching thereat; it is contemplated that this will occupy but little of their time.

A required number of trunks connect the teletypewriter exchange, or central, office switchboard with the satellite switching center, and individual lines connect the subscribers' stations with the satellite switching center. It is broadly within the scope of the invention that some of the trunks from the satellite switching center extend to one teletypewriter exchange office and that the other trunks extend to one or more other teletypewriter exchange offices. Also it is within the scope that the trunks between the satellite and the teletypewriter exchange office may operate on a two-path, or two-conductor, polar basis, or over a single conductor. Although the system described herein makes use of magnetically operated visual signals and drops for supervisory purposes, it is within the scope that lamp signals may be used for this purpose. If two-conductor trunks are employed, each of the trunks may terminate at the teletypewriter exchange office switchboard in a manner disclosed in Fig. 8 of U. S. Patent 2,143,000, granted to W. W. Cramer et al., on January 10, 1939, or if single-conductor trunks are desired, each trunk may terminate in accordance with Fig. 2 of U. S. Patent 2,143,000.

Provisions may readily be made whereby the subscribers whose stations are too distant from the satellite switching center to be connected thereto by an ordinary subscriber's loop circuit, may be connected over a toll line.

Hereinafter the teletypewriter exchange, or central, office will be referred to as the exchange office.

GENERAL DESCRIPTION

Operation of an incoming call

In making a call from the exchange office to a subscriber's station, the operator at the exchange office switchboard uses a cord circuit for plugging into a jack connected to an idle trunk which extends to the satellite switching center. The operator then impresses ringing current over either or both trunk conductors. The ringing current automatically causes the following functions at the satellite switching center:

(1) A visual drop signal associated with the selected idle trunk operates;

(2) A motor of the attendant's teletypewriter at the satellite switching center starts to operate;

(3) An audible signal responds;

(4) Sources of potential are furnished for the trunk repeater;

(5) Motor generator sets are automatically started to furnish operating current to the switching equipment and for transmission purposes.

The satellite attendant upon noting the operator's signal operates an answer key associated with the calling trunk to thereby connect the teletypewriter at the satellite switching center across the loop of the trunk repeater. The closure of the loop side of the repeater extinguishes the cord lamp at the distant exchange office switchboard which signifies to the exchange office operator that the satellite attendant is ready to receive the number of the called subscriber's station. The repeater in the trunk repeats the signals corresponding to the number of the called subscriber's station to cause the called station number to be typed on the attendant's teletypewriter. The attendant upon noting the number of the called subscriber's station operates a key connected in both the calling trunk and the line circuit of the called subscriber's station to connect the called station line to the repeater, and then restores the operated answering key which disconnects the attendant's teletypewriter from the calling trunk. The cord lamp at the exchange office switchboard now lights indicating that that the connection to the called subscriber's station has been established and that the exchange office switchboard operator may, when she is ready, transmit ringing current to cause to be operated a ringing guard lamp associated with the termination of the calling trunk at the satellite switching center and an audible signal common to all incoming trunks. The attendant upon noting the signals operates the ring key momentarily in the calling trunk to send a ringing current to the called subscriber's station.

The subscriber at the called station in response to the ringing signal operates a power switch whereby the ringing signal is silenced, the subscriber's teletypewriter motor is started and the station line conductors are now connected through the loop repeater to the calling trunk. The subscriber's teletypewriter at the called station is in condition to receive the message.

The exchange office operator may recall the satellite attendant by first asking the subscriber at the called station to disconnect if the subscriber has answered. Under this condition the operator may ring as for a new call which operates the visual drop signal and thus notifies the attendant of the recall. The subscriber at the called station may recall the operator at the exchange office by operating a recall key whereby the cord supervisory lamp at the exchange office switchboard is lighted and when the recall key is restored and reoperated repeatedly the lamp is caused to flash. The subscriber at the called station disconnects by restoring the power switch which disables the teletypewriter, stops the teletypewriter motor and again connects the subscriber's ringer to the line circuit. The cord supervisory lamp at the exchange office switchboard lights and at the satellite switching center a magnetically operated visual disconnect signal associated with the calling trunk operates together with the audible signal which is common to all incoming trunks. The satellite attendant upon noting the visual and the audible signals restores the operated key that is connected in both the calling trunk and the line circuit of the called subscriber's station, whereby the audible alarm is silenced, and the calling trunk restored to normal. The operator at the exchange office switchboard upon noting the light of the cord supervisory lamp is extinguished removes the cord from the jack of the calling trunk.

Operation of outgoing call

When a call is originated at a subscriber's station, the subscriber operates the power switch whereby the teletypewriter is connected across the loop or line circuit and the teletypewriter motor and rectifier (when provided) are operated as described hereinbefore for an incoming call. At the satellite switching center the audible alarm is automatically sounded, a magnetically operated visual signal associated with the calling line operates and the power control circuit is closed to furnish current for operation of the system and for transmission. The satellite attendant upon noting the signals connects the calling line to an idle trunk by operating a certain key which is in engageable relation with both the idle trunk and the calling line. The signals are restored to normal by the operation of the key and current is applied to the selected trunk to light an answer lamp at the exchange office switchboard. The exchange operator thereupon plugs into the jack associated with the lighted lamp and is thereby prepared to communicate with the calling subscriber.

LOCAL CONNECTION

Calling subscriber requests a local connection

Should it be desired to interconnect for communication purposes two subscribers' stations which are connected to the satellite switching center, the calling subscriber's station is connected through the satellite switching center to the distant exchange office switchboard as just described. The exchange office operator asks the calling subscriber to disconnect until called. The operator upon noting the lighting of the supervisory lamp indicating that the calling station is disconnected, signals the attendant at the satellite switching center. The attendant upon noting the operated visual signal in the calling trunk operates the answering key in the same trunk thereby connecting the attendant's teletypewriter with the trunk and extinguishing the supervisory lamp at the teletypewriter exchange office switchboard. The exchange office operator informs the satellite attendant that station A is calling station B. The satellite attendant successively operates two keys one of which is in engageable relation with both the calling trunk and a local extension trunk and the other of which is in engageable relation with both the local extension trunk and the called subscriber's line circuit. The local extension trunk which is common to all incoming trunks is now connected to the called subscriber's station, the calling subscriber's station and the incoming trunk. The satellite attendant then restores the answering key in the incoming trunk and the supervisory lamp in the exchange office switchboard lights indicating that the ringing may proceed. The exchange operator rings momentarily to light the ringing guard lamps respectively included in the incoming trunk and the local extension trunk. Upon hearing the audible alarm and noting the lighted guard lamps, the satellite attendant rings both subscribers' stations A and B by operating the ring key in both the incoming and the local extension trunk. When the subscribers of stations A and B respond, the ringing guard lamps for the incoming and the local trunks respectively become extinguished and the connection is ready for communication with the exchange operator supervising the connection as though it had been established through her cord circuit.

A feature of the invention is the use of a cordless switchboard at the satellite switching center whereby a call may be established by means of an operable key between any one of a plurality of subscribers' stations and any one of a lesser number of trunks extending to a distant exchange office, and between any two of a plurality of subscribers' stations connected to the one satellite switching center.

Another feature is the use of an extension trunk at the satellite switching center in conjunction with only one trunk from the exchange office for establishing a connection between any two of a plurality of subscriber's stations.

Still another feature is the provision of a system hereinbefore described with all of the facilities of supervision at both the exchange office and the satellite switching center.

Another feature is the provision of the system hereinbefore described with means for calling unattended stations.

Another feature is the provision of a system hereinbefore described with key operated means for sending a busy signal to the exchange office operator when the subscriber's station to which a call is requested is busy and to the subscribers when all trunks are busy.

Another feature is the provision of remote control of the motor generator sets and the attendant's teletypewriter at the satellite switching center from the teletypewriter exchange office switchboard and any one of the subscribers' stations.

Another feature is the provision of immediate ringing on a called subscriber's station by the satellite attendant when requested to do so by the exchange office operator.

Another feature is the means available for a call between two local subscribers' stations that makes it impossible for the satellite attendant to ring one station and forget to ring the other.

The system as shown herein is suitably adapted to employ five incoming trunks and twelve subscribers' stations although only four trunks and two subscribers' stations are shown.

In the drawings:

Fig. 1 shows a block arrangement of the system wherein the central office equipment of the teletypewriter exchange system is shown in diagrammatic form as being located at a distant point X, the satellite switching center equipment at a local point Y and two subscribers' stations A and B connected by line circuits to the satellite switching center;

Fig. 2 shows the relative arrangement of the various figures of the drawings;

Figure 3:
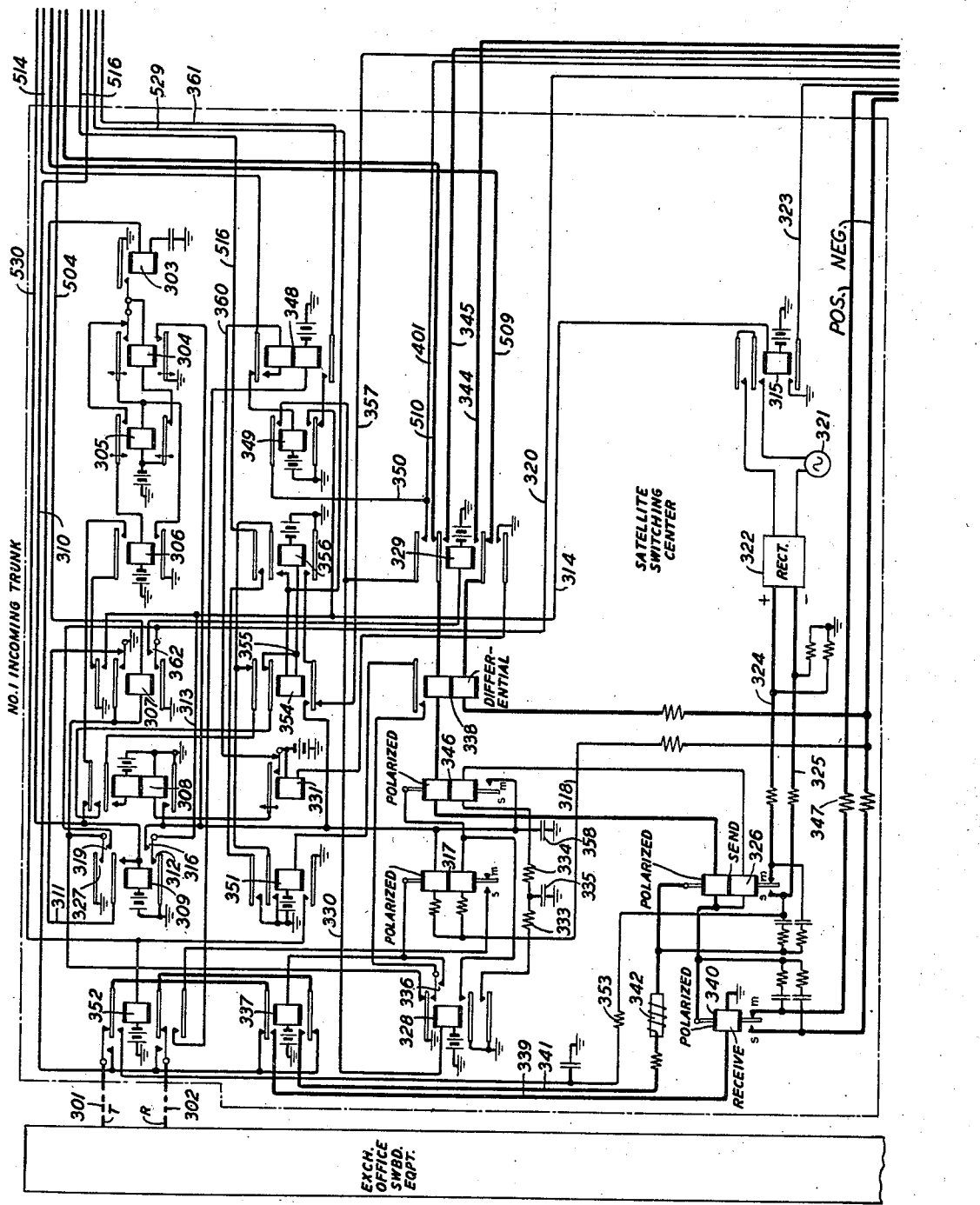
Figure 4:
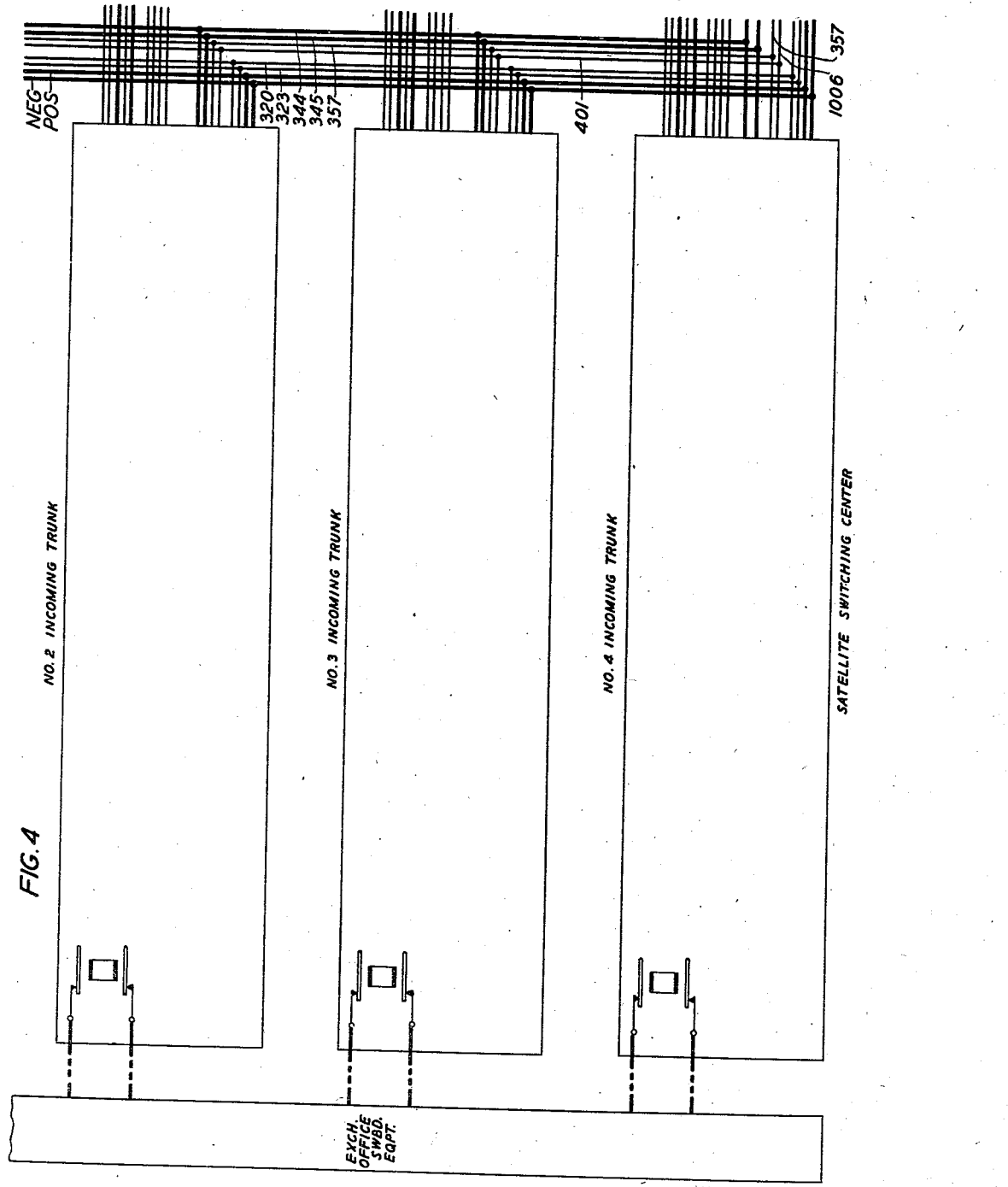
Figure 5:
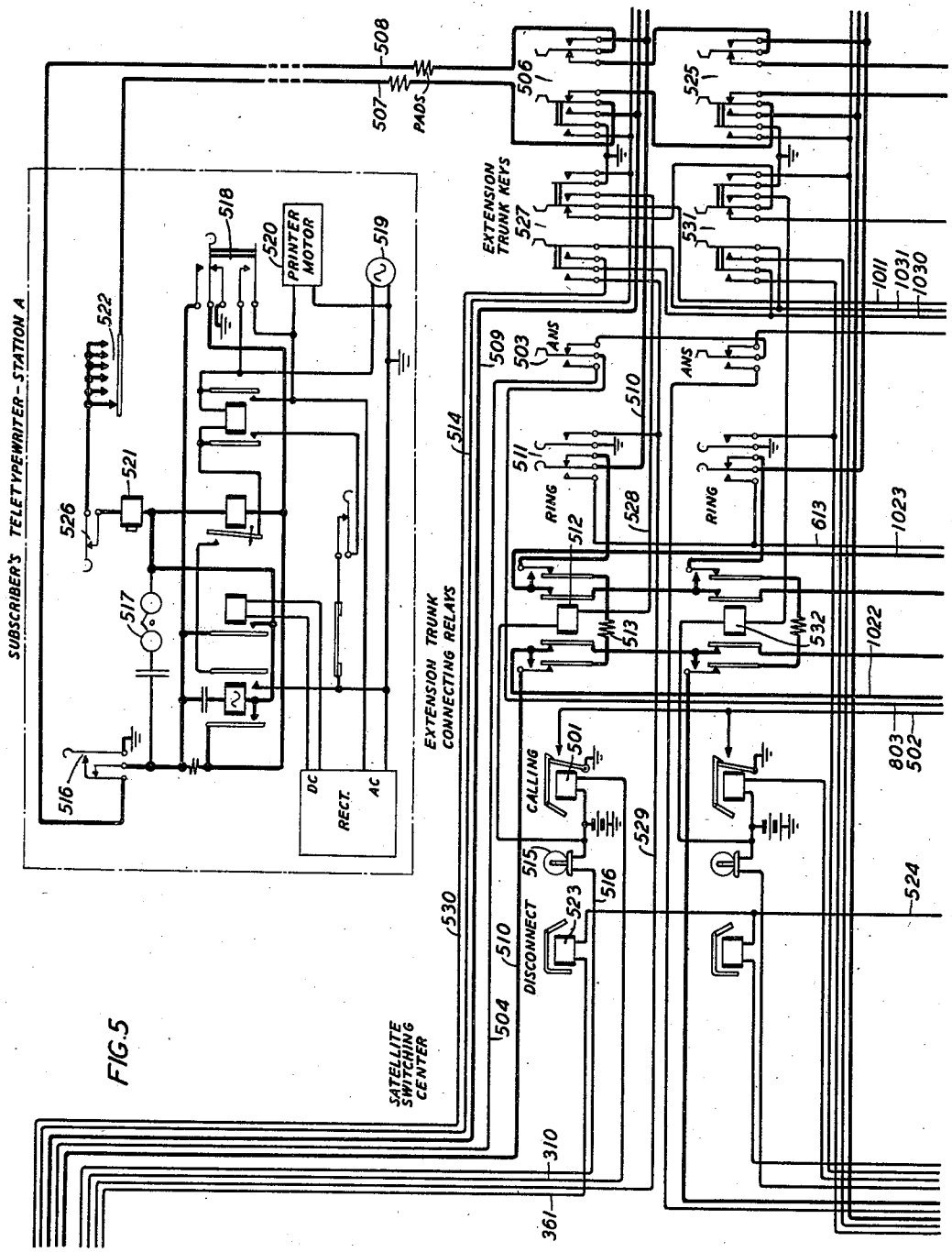
Figure 6:
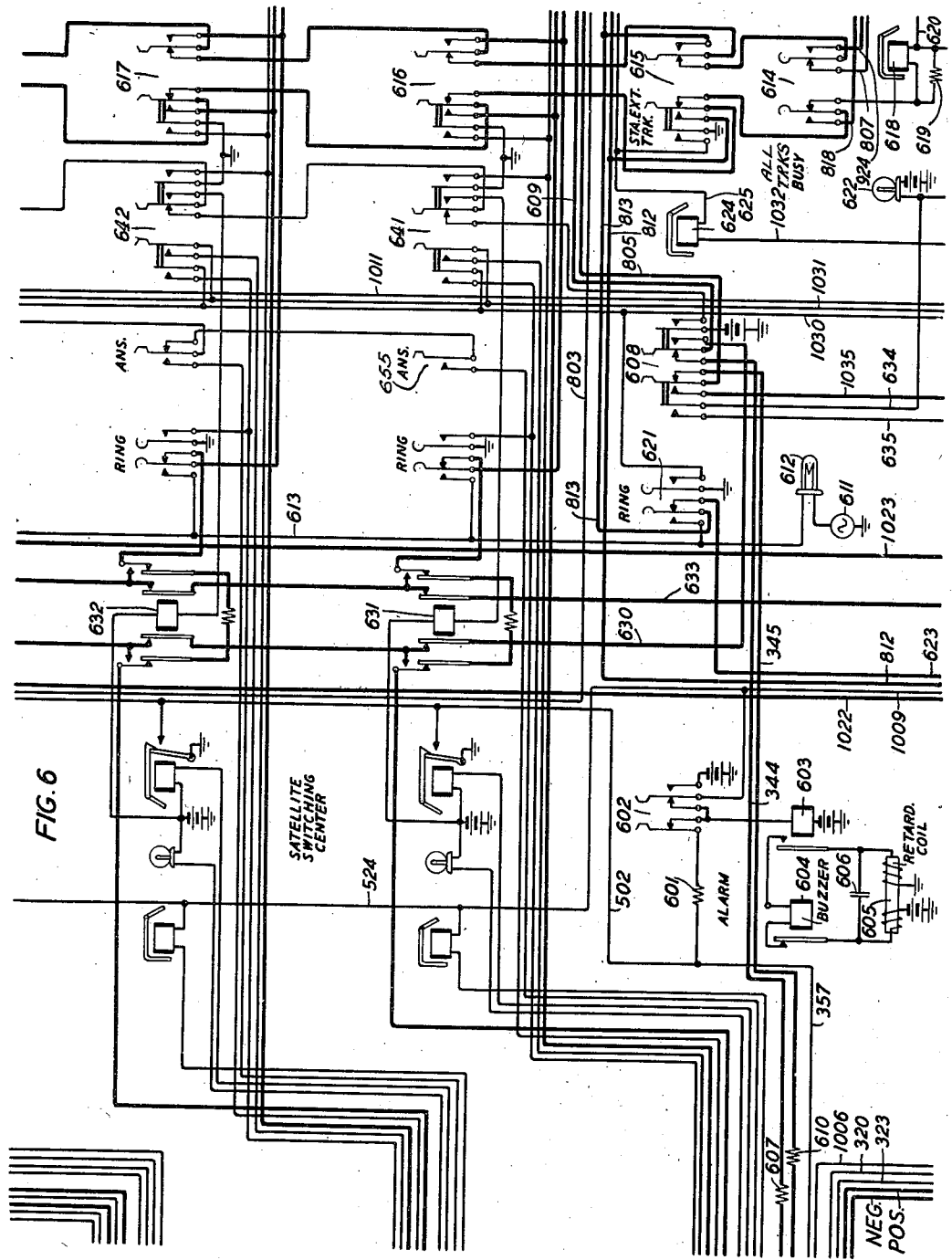
Figure 7:
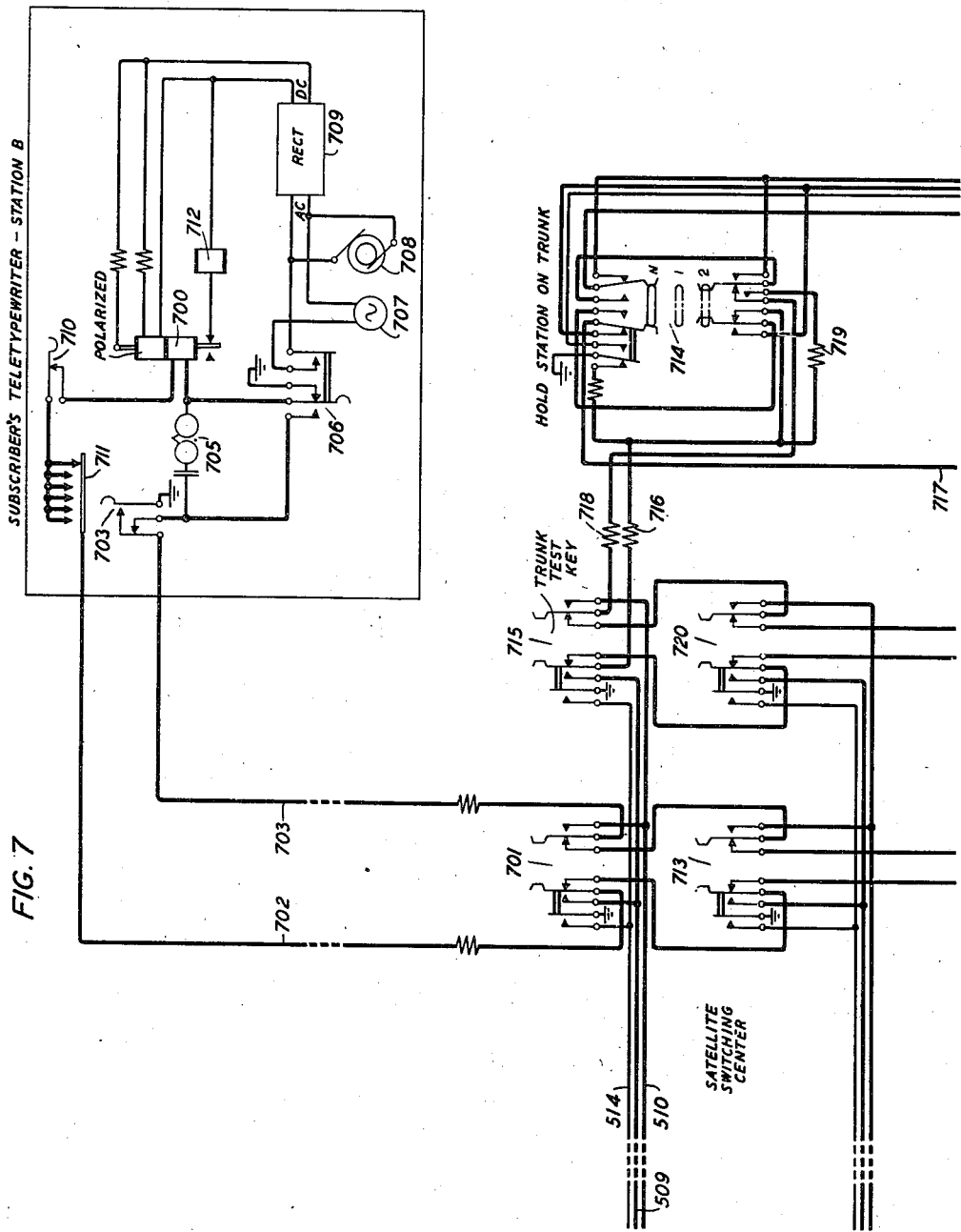
Figure 8:
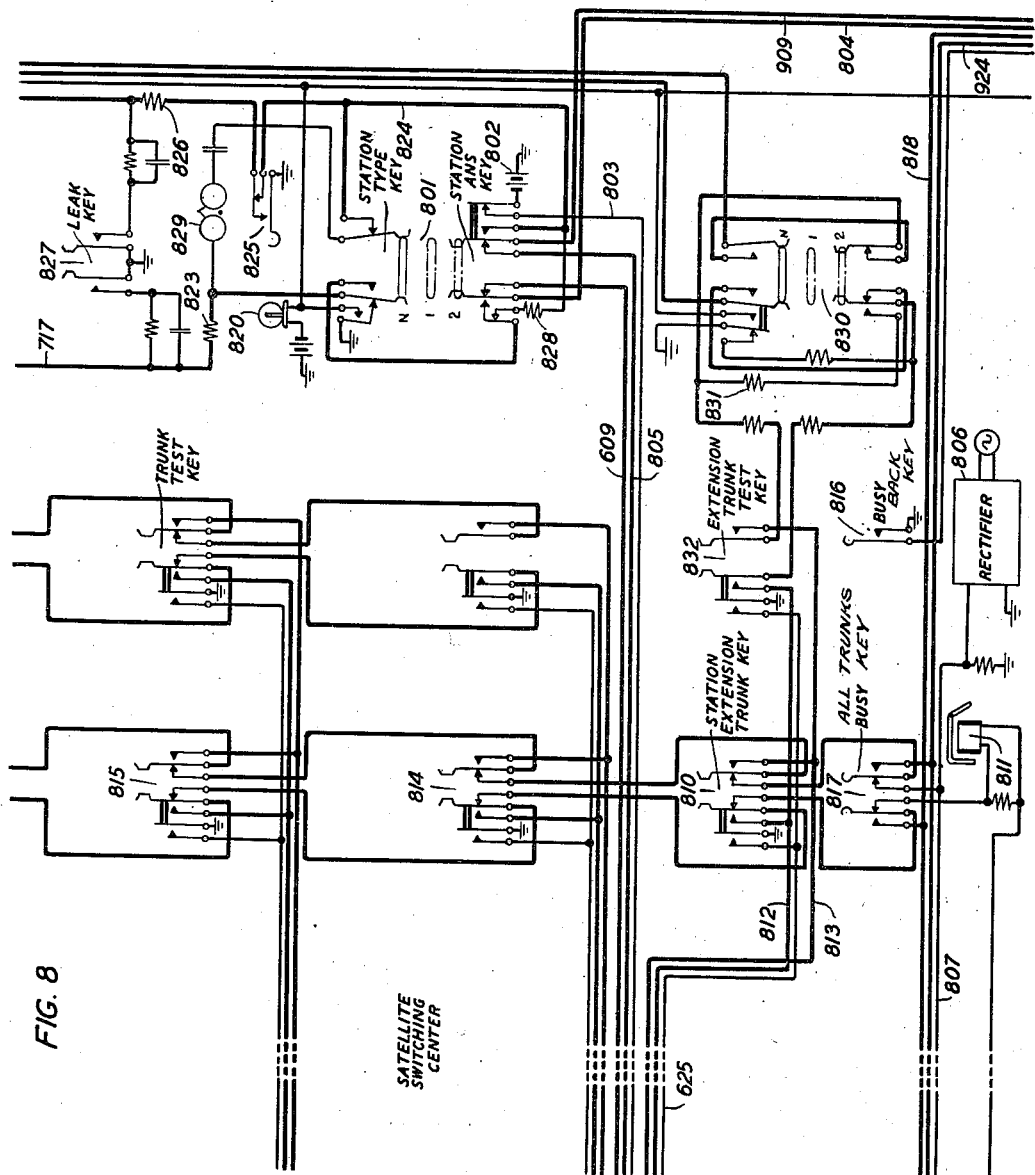

Fig. 3 shows in detail the schematic circuit for the terminating equipment for trunk No. 1 connected by trunk conductors to the distant teletypewriter exchange, or central office equipment (polar relays 340 and 326 with their associated spark killers and wave shaping network constitute a telegraph repeater, well known in the art, which provides two-path polar transmission on the trunk side and open and closed transmission in a differential balanced loop on the station side);

Fig. 4 shows in diagrammatic form the terminating equipment for trunks Nos. 2, 3 and 4;

Fig. 5 shows in detail the schematic circuit for subscriber's station A and the supervisory equipment and switching keys for establishing connections between station A and trunks Nos. 1 and 2;

Fig. 6 shows in detail the schematic circuit for the supervisory equipment and switching keys for establishing connections between subscriber's station A and trunks Nos. 3 and 4. Also shown in detail are the schematic circuits for the audible alarm signal control equipment which is common to all trunks employed in the system, the switching key for connecting station A with an extension trunk which is also common to all incoming trunks and a busy-back key and an all-trunks-busy key for station A;

Fig. 7 shows in detail the schematic circuit for subscriber's station B and the switching keys for establishing connections between subscriber's station B and trunks Nos. 1 and 2; also there is shown the schematic circuits controlled by test keys for trunks Nos. 1 and 2 and a key for maintaining an established connection between a station line and a trunk;

Fig. 8 shows in detail the schematic circuit for station B and the switching keys for establishing connections between subscriber's station B and trunks Nos. 3 and 4; also there are shown the schematic circuits controlled by test keys for trunks Nos. 3 and 4, a switching key for connecting station B with the extension trunk and extension trunk test keys, a busy-back key and an all-trunks-busy key for station B, and a key for maintaining an established connection between a subscriber's station line and the extension trunk;

Fig. 9 shows the schematic circuit for the satellite attendant's teletypewriter and busy-back signals; and Fig. 10 shows in detail the schematic circuit for the extension trunk and the motor generator sets and control circuits therefor (polar relays 1015, 1016 and 1017 constitute a telegraph repeater, well known in the art, which provides open and closed transmission in a differential balanced loop on one side and open and closed transmission in a series connected loop on the other side).

For the other subscribers' stations intermediate stations A and B, but which are not shown in the drawings, it is assumed that additional equipment corresponding to that which is stated herein as being respectively associated with stations A and B, will be provided and such additional equipment will be in associable relation with each of the incoming trunks in the same manner as the equipment associated with stations A and B.

A detailed description of the system will now be given using incoming trunk No. 1 which comprises conductors 301 and 302.

The operator at the distant exchange office desires to establish a connection over incoming trunk No. 1 to one of the subscriber's stations that is connected to the satellite switching center. The operator by plugging into an idle trunk jack at the exchange switchboard (not shown) and by operating a key, transmits an impulse of ringing current over either or both of line conductors 301 and 302, depending on whether the line is of the single or double-conductor type as shown. In response to the ringing current, relay 303 operates and closes an obvious operating circuit for slow-to-release relay 304. Relay 304 upon operating, causes slow-to-operate relay 305 to operate. Because of the slow-to-release and slow-to-operate characters of relays 304 and 305, respectively, a transient current impulse over the line which operates relay 303 momentarily is ineffective to initiate a connection. If relay 303 remains operated sufficiently long, relay 304 eventually releases since its operating path is opened by the operation of relay 305. Relay 304, upon releasing, completes a path for operating relay 306 and opens the operating circuit of relay 305. Relay 306, however, operates fast and thereby holds relay 305 operated. This arrangement assures that only one pulse is obtained from the lower armature and contact of relay 306 during one ringing interval.

Relay 306, upon operating, closes at its upper armature and contact a circuit traceable from ground at the outer upper armature and back contact of relay 307, upper armature and contact of relay 306, outer upper armature and back contact of relay 308, then in parallel paths one extending through the winding of relay 309 to grounded battery and the other extending over conductors 310, through the winding of visual signal drop relay 501 to grounded battery. Relay 309 operates and locks up over a path extending over its contact and inner upper armature, conductor 311, to ground at the normally closed make-before-break contact of relay 307. Relay 309, upon operating, closes at its lower armature and contact 312, a circuit extending from ground, over conductors 313 and 314, through the winding of power relay 315 to grounded battery to operate relay 315, and contact 316 prepares a circuit for causing relay 317 to hold open its left-hand contact, as shown, as soon as telegraph battery is available on conductor 318. Also relay 309, upon operating, closes at its outer upper armature and contact 319, a circuit extending from ground over conductor 320, through the winding of the motor start relay 901 in the attendant's teletypewriter 900 at the satellite switching center. Relay 901 operates and the resulting functions will be hereinafter described.

Signal drop relay 501 operates and causes a drop shutter to operate thereby providing for the attendant at the satellite switching center a visual signal indicating that a connection over incoming trunk No. 1 is desired. Relay 501, upon operating, closes at its armature and contact a circuit extending from ground, over conductors 502 and 601, normally closed contacts at the left spring member of key 602, through the winding of relay 603, to grounded battery. Relay 603 operates and closes an obvious circuit for operating buzzer relay 604. Relay 604 operates to provide for the satellite attendant an audible signal that a connection is desired. Retardation coil 605 and condenser 606 reduce the possibility of noise being impressed by the self-interrupting buzzer relay 604 on telephone circuits which may be served by the same battery plant.

*Motor generators started*

Power relay 315, upon operating in a circuit hereinbefore described, connects at its upper armatures and contacts the power supply 321 to the rectifier 322 and at its lower armature and contact connects ground in a circuit extending over conductors 323 and 1001, through the winding of relay 1002 to grounded battery. Rectifier 322 which, upon energizing, provides direct current of positive polarity to conductor 324 and direct current of negative polarity to conductor 325, to transmit polar signals over the contacts and armature of send repeater through 326 to the central office switchboard. Relay 1002 which is of the slow-to-release type operates and at its lower armature and contact closes an operating circuit for relay 1003 and at its upper armature and contact closes an operating circuit for slow-to-operate relay 1004. Relay 1004 operates slowly for a purpose which will be hereinafter described. Relay 1003 operates and closes at its armatures and contacts a circuit for connecting alternating current source 1005 to motor generator sets Plus and Minus (Fig. 10). Current of positive and negative polarities are now impressed on conductors POS and NEG, respectively; the negative current being now applied to conductor 318 through upper winding of polar relay 317 whereby the relay armature moves away from its left-hand contact as hereinbefore mentioned and as shown in the drawing. After a short interval of time, that is, sufficient to assure that the motor generator sets and teletypewriter motor 902 have attained full speed, ground is applied over the armature and contacts of slow-to-operate relay 1004 to conductors 1006 and 401, connected in series, for a purpose to be hereinafter described. Teletypewriter motor 902 started to operate when relay 901 closed at its lower armatures and contacts a circuit including power source 904. When relay 901 operated, it closed at its upper armature and contact an obvious circuit for energizing printer magnet 910 and the lower, or biasing, winding of polar relay 905.

*Satellite attendant answers*

The attendant upon receiving the visual and the audible signal operates the answering key 503 in incoming trunk No. 1 and restores manually the shutter of drop 501 which silences the audible signal. The operation of the answering key 503 closes a circuit extending from grounded battery 802 at the lower outer right-hand spring of key 801, conductor 803, operated contact and spring of key 503, conductor 504, through the winding of relay 307, contact 327 to ground or to ground at the back contact and upper armature of relay 328. Should the incoming call be on incoming trunk No. 4 instead of on incoming trunk No. 1, the ground on the spring 801 would have been connected in a circuit which would extend over conductor 803 through the contacts of the lower numbered trunk answering keys, in chain, to the contacts of the No. 4 trunk answering key which herein is designated 655; the answering key 503 for incoming trunk No. 1 would have been, under such circumstances, in its normal position.

Relay 307 operates and locks in a circuit closed at its inner upper armature and front contact. Relay 307, upon operating, opens at its upper make-before-break contacts, the locking circuit for relay 309. Relay 309 releases. Also relay 307, upon operating, substitutes at its upper inner armature and front contact a ground for maintaining power relay 315 operated when relay 309 releases. Furthermore relay 307, upon operating, closes at contact 362 an obvious operating circuit for relay 329 which operates.

If by this time the power control circuit is closed at the armature and contact of relay 1004, as hereinbefore described, relay 329, upon operating, will now extend the circuit including conductors 1006 and 401, over the outer upper armature of relay 329, conductor 330, through the winding of relay 328 to grounded battery. Relay 328 operates. Also relay 329, upon operating, closes at its outer lower armature and contact a circuit for operating slow-to-release relay 331. Relay 331 operates to effect the operation of relay 308. Relay 308, upon operating, replaces at its lower armature and contact, the ground connection for the upper winding of relay 317 when such connection was opened by the release of relay 309. Also relay 308, upon operating, prepares at its upper inner armature and contact a locking circuit for itself which will extend, when completed, over the outer upper armature and back contact of relay 354, inner upper armature and contact of relay 351 to ground.

Relay 328, upon operating, connects at its outer lower armature and contact a ground connection to the artificial loop consisting of resistances 333 and 334 and condenser 335 of the trunk repeater and at its inner lower armature and contact a ground connection to bias polar relay 317 through its lower winding so as to cause relay 317 to make its left-hand contact. Also relay 328, upon operating, closes at its contact 336 an obvious operating circuit for relay 337 and at its upper armature and front contact connects ground to the contact of relay 338. Relay 337, upon operating, transfers trunk No. 1 consisting of conductors 301 and 302, from its back to its front contacts whereby trunk No. 1 is disconnected from relay 303 and conductor 301 is connected over conductor 339 to ground through the winding of the trunk repeater receive relay 340, and conductor 302 is connected over conductor 341, through the winding of retardation coil 342, armature and left-hand, or space, contact of the trunk repeater send relay 326, conductor 325 to negative side of rectifier 322.

*Attendant's teletypewriter connected*

When relay 329 operated, as hereinbefore described, the attendant's teletypewriter 900 is connected to the operating winding of send repeater relay 326 in a circuit traceable from motor generator set Minus (Fig. 10), conductor NEG, through the lower winding of differential relay 338, inner lower armature and front contact of relay 329, conductor 344 including pad resistance 607, normally closed contact and right spring member of key 608, conductor 609, normally closed contact and left lower spring member of key 801, conductor 804, shunt key 907, upper winding of polarized relay 905, normally closed make-before-break contacts of relay 908, conductor 909, inner normally closed contact and inner right lower spring member of key 801, conductor 805, inner left spring member and normally closed contact of key 608, conductor 345 including pad resistance 610, front contact and inner upper armature of relay 329, through the upper windings, in series, of differential relay 338 and polar relay 346, upper winding of repeater send relay 326, armature and right-hand, or mark, contact of repeater receive relay 340, battery tap resistance 347, conductor POS, to motor generator set Plus. Relay 338 does not operate but polar relays 346 and 326 close their right-hand, or mark, contacts.

*Teletypewriter exchange operator receives signal to type called subscriber's station number*

The closure of the loop side of the trunk repeater at the inner upper armature and front contact of relay 329 and the operation of relay 337 causes positive current, which is marking in this case, to be applied to the trunk conductor 302 whereby the operator's cord lamp (not shown) at the teletypewriter switchboard at the exchange office, becomes extinguished which signifies to the operator at the exchange office that she should type the number of the called subscriber's station. The telegraph signals constituting the called subscriber's station number operating on a polar basis over conductor 301 cause repeater receive relay 340 to repeat the signals to the attendant's teletypewriter 900. When the loop circuit of the trunk repeater is normally closed, relay 905 at the attendant's teletypewriter is in its right-hand position as shown and the printer magnet 910 is held operated in a circuit traceable from motor generator set Minus (Fig. 10) over conductors NEG and 911, armature and right-hand contact of relay 905 through the winding of magnet 910 to ground at the upper armature and contact of relay 901. In response to the first space signal which constitutes the start impulse of the first character received from repeater receive relay 340, relay 905 operates to its left-hand position under the influence of the current flowing in its lower winding and therefore the printer magnet 910 releases. The selected impulses of the first character operate and release printer magnet 910 according to the nature of the signal and the received signal is accordingly recorded on the attendant's teletypewriter.

*Satellite attendant connects trunk to the called station*

Assume that it is desired to establish the connection with subscriber's station A and that the number of such station is 10. Accordingly the operator at the exchange office types the number 10. The attendant, upon noting that the signals received cause the number 10 to be typed on teletypewriter 900, operates key 506, which is the key on incoming trunk No. 1 that is assigned to subscriber's station A. Key 506, upon being operated, disconnects station loop conductors 507 and 508 from the corresponding key for the other incoming trunks and connects them respectively to conductors 509 and 510, conductor 510 including the left-hand spring member and normally closed contact of ringing key 511, the back contacts and outer armatures of relay 512 and pad resistance 513. A ground at the contact and outer left spring member of key 506 is connected over conductor 514, upper armature and back contact of relay 348, through the winding of relay 349 to grounded battery. Relay 349 operates and at its lower armature and front contact connects a second ground over conductor 314 for maintaining power relay 315 operated. The prior ground connected to conductor 314 for operating relay 315 is about to be removed when the attendant restores the answering key 503. Relay 349, upon operating, also extends the ground on conductor 401 over conductor 350, upper armature and contact of relay 349, conductor 330, through the winding of relay 328 to grounded battery. Relay 328 is thus maintained operated when the answering key 503 is restored.

*Teletypewriter exchange operator notified that connection has been established*

Immediately upon operating station key 506, the attendant restores answering key 503 to normal. Key 503, upon being restored, opens the operating circuit for relay 307 which releases and causes the release of relays 329 and 901. Relay 901 released, shuts down the attendant's teletypewriter. The release of relay 329 opens the operating circuit for slow-to-release relay 331 and transfers the loop conductors of the repeater from the attendant's teletypewriter 900 to conductors 509 and 510 to which subscriber's station A is now connected. Since the subscriber at called station A has not as yet answered, loop conductor 510 terminates at the ringer and condenser at the station and loop conductor 509 terminates at ground at the station. Differential relay 338 operates and thereby causes relay 351 to operate. Relay 351, upon operating, provides through its inner upper armature and contact a locking circuit for relay 308. Relay 331 whose operating circuit was opened by relay 329, is sufficiently slow to release to assure the locking circuit for relay 308 to be completed before the operating circuit for relay 308 is opened by relay 331 releasing. Relay 351, upon operating, also operates relay 352. Relay 352, upon operating, transfers the line conductors 301 and 302 from the trunk repeater to the winding of relay 303 and provides an artificial line consisting of resistance 353 to hold relay 340 in a marking, or right-hand, position. This transfer of the line conductors causes the cord lamp at the operator's position at the distant teletypewriter exchange switchboard to be lighted as an indication that connection has been established to the called subscriber's station A and that the exchange office operator may ring the station when she is ready to complete the connection.

*Teletypewriter exchange operator indicates that called station A is to be rung*

When the operator rings, ringing current over the line conductors 301 and 302 causes relays 303, 304, 305 and 306 to operate in a manner hereinbefore described for an incoming call signal. Relay 306, upon operating, closes a circuit extending from ground at the outer upper armature and back contact of relay 307, over the upper armature and contact of relay 306, outer upper armature and front contact of relay 308, inner upper armature and contact of relay 354, a common point 355, through the winding of relay 356 to grounded battery. Relay 356 operates and closes an operating circuit for relay 354 which extends from grounded battery through the winding of relay 356, common point 355, through the winding of relay 354, contact and inner upper armature of relay 356, inner upper armature and contact of relay 351 to ground. Relay 354 does not, however, operate at this time because of the shunt to ground at the common point 355. Also relay 356, upon operating, closes a circuit extending from ground, lower armature and contact of relay 356, the lower armature and back contact of relay 354, conductor 357, left spring member and contact of key 602, through the winding of relay 603, to grounded battery. Relay 603 operates and thereby operates buzzer 604 to provide an audible alarm for the attendant. The audible alarm persists until relay 354 operates. Also when relay 356 operated, another circuit was closed from grounded battery, through ringing guard lamp 515, conductor 516, outer upper armature and contact of relay 356, outer upper armature and contact of relay 351, to ground. When eventually the ringing period controlled by the operator at the exchange office is terminated, relay 306 releases and thereby removes the ground from common point 355 to permit relay 354 to operate over the path hereinbefore described as being prepared, or closed, by relay 356. Relay 354, upon operating, causes relay 308 to release so that a subsequent ringing signal can act to recall the attendant as hereinafter described. Relays 354 and 356 together provide a holding path to prevent polar relay 317 from closing its left-hand contact at this time which it would otherwise do when relay 308 released.

*Satellite attendant rings called station*

Lamp 515 lights as an indication that the attendant should ring momentarily on the connection established for the calling incoming trunk No. 1. This is accomplished by operating momentarily ring key 511 to the left to close a circuit from source 611 of ringing current, lamp 612, conductor 613, operated contact and left-hand spring member of key 511, conductor 510, operated contact and right-hand spring member of key 506, conductor 508, normally closed contacts of recall key 516, through the circuit of ringer 517, normally closed contact at the upper spring member of key 518 to ground. The audible signal indicates to the subscriber at station A that a message awaits and that he should operate start key 518 to connect his teletypewriter to the line circuit comprising conductors 507 and 508.

*Subscriber at called station A answers*

When the subscriber at called station A answers by operating start switch 518 and alternating current power source 519 is connected to start the printer motor 520 and the printer magnet 521 and transmitting contacts 522 are connected at the operated contact and upper spring member of switch 518 to the line circuit comprising conductors 507 and 508. The power switch 518, when operated, also short-circuits the operating circuit for ringer 517.

Should the called subscriber's station be of the type which requires a polarized relay to obtain satisfactory transmission over long loops such as that designated station B in Fig. 7, the circuit requirements will be slightly different from those shown for station A. Let it be assumed that a call incoming over trunk No. 1 is for station B. In that event key 701 instead of key 506 will be operated whereby the loop conductors 509 and 510 of the incoming trunk repeater will be respectively connected to line conductors 702 and 703 and the ringing current applied at key 511 by the attendant at the satellite switching center will flow over conductor 510, operated contact and right-hand spring member of key 701, conductor 703, normally closed contact of recall key 703, through the path including ringer 705, to ground at the normal contact and left-hand spring member of switch 706. In response to the operation of ringer 705, the subscriber at station B will operate power switch 706 to connect an alternating current source 707 to operate the teletypewriter motor 708 and rectifier 709, and to short-circuit ringer 705. The operation of power switch 706 also places the lower winding of polarized relay 700, break key 710, and sending contacts 711 across line conductors 702 and 703. The rectifier 709 furnishes direct current for biasing polarized relay 700 to its right-hand, or marking, contact and operating current for printer magnet 712.

The closure of the line conductors and the removal of ground at the normally closed spring member of either of power switches 518 or 706 depending upon which of stations A and B is engaged in the connection, cause polar relays 346 and 326 to close their right-hand, or marking, contacts and cause differential relay 338 to release thereby releasing, in turn, relay 351. Relay 351, upon releasing, extinguishes ringing guard lamp 515 and releases relay 352 which reestablishes the transmission path between the trunk conductors 301 and 302 and the trunk repeater which includes conductors 339 and 341. Positive, or mark, battery at right contact of repeater send relay 326 is therefore connected to trunk conductor 302 which extinguishes the cord lamp at the exchange office indicating to the operator that communication may proceed.

Also relay 351, upon releasing, releases relays 354 and 356. The removal of ground from the upper, or operating, winding of relay 317 which was applied by relays 354 and 356, is now replaced by a ground at relay 346. Although relay 346 follows signals transmitted by the subscriber's station, the capacity of condenser 358 and the associated networks is such as to cause relay 317 to hold its left-hand contacts open for an appreciable length of time so that even through the station attendant may break for as long as three seconds, relay 317 will remain operated.

*Exchange operator recalls*

After connection has been established and answer key 503 is restored as hereinbefore described, the attendant has no further control over the connection nor will the operation of answer key 503 again connect a teletypewriter to the incoming trunk No. 1 for the reason that no ground is supplied to the winding of relay 307. However, if the exchange operator desires to recall the attendant at this time, she may do so by first asking the subscriber at called station A to disconnect if the subscriber has answered. Under this condition the exchange operator may ring as for a new call, operating the signal drop 501 and thus informing the attendant that she is wanted. The recall of the satellite attendant is hereinafter described in connection with establishing a local connection.

*Station subscriber recalls*

The station subscriber may recall by repeatedly operating a recall key such as 516 at station A or 703 at station B. The recall key, upon being operated, opens one of the line conductors and then connects ground to it. Under this condition, relays 326 and 346 are held marking, that is, in their right-hand positions and the differential relay 338 operates causing relay 351 to operate. Relay 351, upon operating, causes relay 352 to operate and thereby to transfer the trunk conductors 301 and 302 from the trunk repeater. This condition causes the cord supervisory lamp at the operator's switchboard at the exchange office to light. Each time the station subscriber restores the recall key, relays 338, 351, and 352 release. This condition causes the lighted supervisory lamp at the exchange switchboard to flash.

*Station subscriber disconnects*

When the station subscriber disconnects by restoring the power switch, such as 518 at station A or 706 at station B, power supply circuit to the teletypewriter motor and rectifier at the station is opened. The line conductor is again placed in series with the condenser, ringer and ground and the other conductor is again grounded at the station on the tip side. Relays 338, 351, and 352 operate as for a recall signal but relays 346 and 326 now go spacing and thereby close their left-hand contacts. This condition causes the lamp at the exchange switchboard to light. After an interval, relay 317 will release to its left-hand position to close a circuit extending from ground at the upper armature and front contacts, in series, of relay 328, armature and left-hand contact of relay 317, outer lower armature and contact of relay 352, through the lower winding of relay 348, to grounded battery. Relay 348 operates and transfers conductor 514 by means of the upper armature of the relay from its back contact to its front contact thereby closing a locking circuit through the upper winding of the relay, conductor 360, normally closed contacts of relay 331 to grounded battery. The operating circuit for relay 349 is thereby opened and relay 349 releases to close a circuit from ground, lower armature and back contact of relay 349, front contact and lower armature of relay 348, conductor 361, through the winding of drop signal relay 523, conductor 524, right-hand spring member and normally closed contact of key 602, through the wnding of relay 603, to grounded battery. Drop signal relay 523 operates to give a visual signal and relay 603 operates to close the operating circuit for buzzer relay 604 to give an audible signal. Relay 349 released, also opens at its lower armature and front contact, the operating circuit for relay 315 and its upper armature and contact, opens the operating circuit for relay 328. Relay 315 releases. Relay 328 releases and at its upper armature and lower front contacts opens the operating circuit for relays 337 and 351 which release. The trunk is now prepared to receive another incoming call.

Relay 315, upon releasing, opens the power supply circuit for rectifier 332 and removes ground from conductors 323 and 1001 in series. If no other call is in progress, i. e., no other ground on conductor 1001, relay 1002 releases and opens the operating circuits for relays 1004 and 1003. Relay 1003, upon releasing, opens the power supply circuit for motor generator sets Minus and Plus. Relay 1004, upon releasing, disconnects at its lower armature the ground connection from conductors 1106 and 401, which were included in the operating circuit for relay 328.

*Satellite attendant disconnects station*

The attendant upon noting the visual disconnect signal at drop relay 523 associated with incoming trunk No. 1, restores the station key such as 506 for station A or 701 for station B which transfers the line conductors from incoming trunk No. 1 causing relay 338 to release and removes ground from conductor 514 thereby opening the locking circuit for relay 348. Relay 348 releases and opens at its lower armature and contact the operating circuit for drop signal relay 523 and relay 603. Drop signal relay 523 releases and restores the visual signal. Relay 603 releases and silences the buzzer or audible signal. The trunk is now restored to normal.

OPERATION OF OUTGOING CALL

*Station subscriber originates a call*

When the station subscriber operates the power switch such as switch 518 at station A or 706 at station B the subscriber's teletypewriter circuit is closed across the loop and the teletypewriter motor operated as described hereinbefore for an incoming call. Also, a rectifier is energized if station B is considered. A circuit is completed extending from ground, through rectifier 806, through one of several chains of switching keys, the chain depending upon which one of the subscribers' stations is employed for originating the call. Should it be assumed that the subscriber at station A originated a call, the circuit may be traced over conductor 807, the normally closed contact and right-hand spring members of keys 614, 615, 616, 617, 525, and 506, in series, conductor 508, the normally closed contacts of recall key 516, operated contact and upper spring member of switch 518, through the winding of printer magnet 521, normally closed contacts of break key 526, sending contacts 522, conductor 507, left-hand spring members and normally closed contacts of keys 506, 525, 617, 616, 615 and 614, in series, through the winding of drop signal relay 618 and resistance 619 in parallel, conductor 620, through the winding of relay 1007 to ground. Relay 1007 operates and contacts at its lower armature an operating circuit for power supply relay 1002 whereby motor generator sets Plus and Minus are operated, and at its upper armature completes a circuit extending from ground, conductors 1008 and 1009, right-hand spring member and normally closed contact of key 602, through the winding of relay 603 to start the buzzer for an audible signal. The operating circuit for relay 1007 also operates drop signal relay 618 which gives to the attendant a visual signal that a connection is desired at subscriber's station A.

*Satellite attendant connects the calling station to an idle trunk*

The satellite attendant upon noting the signals selects an idle trunk extending to the distant exchange office and operates the calling station key which is assigned to the selected trunk. Assume that trunk No. 1 is idle and inasmuch as it is assumed that the call originated at subscriber's station A, the attendant operates key 506. The operation of key 506 connects conductors 507 and 508 to trunk conductors 509 and 510, respectively. Key 506, upon being operated, disconnects visual drop signal 618 and relay 1007. Drop signal relay 618 restores to normal and relay 1007 releases whereby the audible buzzer signal provided by buzzer relay 604 is silenced. Key 506, upon being operated, closes a circuit extending from ground, outer left-hand spring member and operated contact of key 506, conductor 514, upper armature and back contact of relay 348, through the winding of relay 349, to grounded battery. Relay 349 operates and thereby connects at its lower armature and front contact a ground connection to the circuit extending over conductor 314 through the winding of relay 315 to grounded battery. Relay 349, upon operating, also connects at its upper armature and contact, grounded conductors 1006, 401 and 350, in series, to the winding of relay 328, over conductor 330. Relay 315 operates and at its upper armatures and contacts closes an energizing circuit for rectifier 322 and at its lower armature and contact connects ground through a circuit extending over conductor 323 and 1001 through the winding of slow-to-release power control relay 1002 to grounded battery thereby preventing the power control circuit controlled by relay 1002 from restoring to normal after relay 1007 is released.

Motor generator sets Plus and Minus upon attaining their full speed apply a full voltage to the upper windings of polar relays 346 and 326 and both relays are thus maintained in the positions shown, that is in the right-hand position. Relay 328, upon operating, energizes the biasing windings of polar relays 346 and 326 as hereinbefore described and causes relay 337 to operate which transfers the trunk conductors 301 and 302 from the winding of relay 303 to the respective winding and armature of trunk repeater polar telegraph relays 340 and 326. Since the subscriber's station loop is closed differential relay 338 remains unoperated. Polar relay 317 therefore opens its left-hand contact if it was not already opened before.

*Exchange office operator answers*

The closure of the trunk conductors 301 and 302 in the manner described causes the terminating equipment at the exchange switchboard to function and light the answering lamp associated with the trunk jack at that switchboard. When the exchange operator plugs into the trunk jack her cord supervisory signal will remain out and she will be in communication with the calling station which in this case is station A.

The calling subscriber's station may recall as hereinbefore described for incoming calls without bringing in any signal at the satellite switching center.

When the calling subscriber disconnects, the circuit will function as hereinbefore described for disconnection on an incoming call.

OPERATION FOR ESTABLISHING A LOCAL CONNECTION

*Calling subscriber requests a local connection*

Assume that the subscriber at station A has initiated the call and that his line circuit has been connected to the operator's switchboard at the distant exchange office in the manner hereinbefore described. Let it be assumed further that the operator at the distant exchange office has answered and that the subscriber at station A has indicated that he wished to have his line circuit connected to that of another subscriber's station, say station B, served from the same satellite switching center. Under these conditions the operator at the distant exchange office will ask him to disconnect his line circuit until called. This request is made in order that the operator at the distant exchange office may recall the attendant at the satellite switching center.

*Teletypewriter exchange office operator recalls*

As soon as the operator at the exchange office notes that the cord lamp associated with the trunk is lighted as an indication that the subscriber at the calling station has disconnected, the operator will immediately ring over the trunk circuit to the attendant at the satellite switching center.

The ringing current will cause relays 303, 304, 305 and 306 to operate as hereinbefore described. Relay 304, it will be noted, provides, upon operating, a holding ground for relay 317 so that even though relay 346 has opened its left-hand contacts when the calling subscriber is connected and relays 338, 351 and 352 operated to provide the operator at the exchange office with the disconnect signal, relay 317 will usually be prevented from closing its left-hand contacts. However, if the operator at the exchange office was slow in ringing, and relay 317 closed its left-hand contacts and thus operated relay 348 and, in turn, the visual disconnect signal 523, both will be again restored to normal when relay 331 operates in response to the operation of answering key 503 by the attendant at the satellite switching center.

*Shutter of drop signal relay falls and satellite attendant answers*

With relay 306 operated, relay 309 operates as hereinbefore described and drop signal relay 501 is energized causing its shutter to fall and energize the audible alarm circuit comprising buzzer relay 604. The satellite attendant answers by operating answering key 503 thus connecting her teletypewriter 900 to the loop repeater and causing the supervisory lamp at the exchange switchboard to be extinguished as hereinbefore described for an incoming call.

*Teletypewriter exchange operator types order*

The exchange office operator thereupon types the order such as "station A calling station B".

*Satellite attendant connects extension trunk*

The satellite attendant thereupon operates the extension trunk key 527 which is associated with trunk No. 1 in order to associate the extension trunk 1000 with trunk No. 1 over which the order came. Key 527 upon being operated also connects ground to conductor 514 over its right-hand spring member and operated contact so that relay 349 is now held operated from both keys 527 and 506. Key 527, in an operated position, closes at its inner right hand spring member and operated contact, a circuit extending from ground through the winding of relay 1010, conductor 1011, inner right spring member and operated contact of relay 527, conductor 528, through the winding of extension trunk connecting relay 512 to grounded battery. Relays 512 and 1010 operate.

Relay 1010, upon operating, connects ground to conductor 1012 including resistance 1013, normally closed contact of relay 1014, through the upper windings, in series, of polarized relays 1015 and 1016, armature and left-hand contact of relay 1017, conductor POS, to motor generator set Plus. Polar relays 1015 and 1016 are thus energized to hold their left-hand, or marking, contacts closed. Relay 1010 at its outer upper armature connects ground to the artificial line of the extension repeater consisting of resistances 1019 and 1020 and condenser 1021 which is connected to the biasing or lower windings, in series, of relays 1015 and 1016. Relay 1010, upon operating, also through its lower armature and associate make contacts connects the biasing, or lower, winding of relay 1017 in series with resistance 1018 to conductor NEG and also through resistance 1033 to the space contact of polar relay 1015 whose armature is connected to conductor POS. Resistances 1018 and 1033 are so proportioned that polar relay 1017 is biased toward its spacing or marking contacts respectively when polar relay 1015 is marking or spacing. Hence when polar relays 1015 and 1016 follow signals from station B, although relay 1016 opens the upper winding of relay 1017; relay 1017 will hold its marking contact closed. However, when the current in the upper winding of relay 1017 is opened by station A or the exchange operator sending a space signal, the relay armature will move to the space contact under the bias condition in the lower winding.

Relay 512, upon operating, inserts the upper winding of polarized relay 1017 and the armature and left-hand, or mark, contact of relay 1016, in series, with conductor 510, at the same time removing the equivalent resistance 513. The upper winding of relay 1017 and the left-hand contact of relay 1016 are thus connected in series with conductor 510 by means of conductors 1022 and 1023, respectively. It is noted that conductors 1022 and 1023 normally include, in regular order, first, the back contacts and inner armatures of the extension trunk relay 512 which is associated with trunk No. 1, secondly, the back contacts and inner armatures of the extension trunk relay associated with trunk No. 2 and then, in turn, the back contacts and inner armatures of each of the extension trunk relays associated with trunk No. 3, etc. so that it is not possible to associate conductors 1022 and 1023 with more than one trunk at a time, the lower numbered trunks having the preference.

*Satellite attendant connects called station line*

The satellite attendant also operates key 810 which is the called station key associated with extension trunk 1000, to connect the called station B with the extension trunk 1000. Key 810, in an operated condition, transfers station line conductors 702 and 703 which are extended through the normal contacts, in series, of the individual incoming trunk keys associated with station B, from the drop signal relay 811 and rectifier 806 to conductors 812 and 813, respectively; there being included in conductor 813 a ringing control spring member of ring key 621. Differential relay 1024 operates in a circuit traceable from motor generator set Minus, conductor NEG, battery tap resistance 1025, through the lower winding of relay 1024, conductor 812, operated contact and inner left spring member of key 810, normally closed contact and inner left spring members of each of keys 814, 815, 713, 701, in series, station line conductor 702, transmitting contacts 711, normally closed contacts of break key 710 through the lower winding of polarized relay 700, left-hand spring member and normally closed contacts of power switch 706 to ground. Differential relay 1024 operates and thereby causes the operation of relay 1026. Relay 1026, upon operating, closes at its lower armature and front contact an operating circuit for relay 1027 which is of the slow-release type. Relay 1027, upon operating, prepares an operating circuit for the subsequent operation of relay 1014. Relay 1026, upon operating, prepares at its upper armature a locking circuit for relay 1028.

The satellite attendant then restores answering key 503 which results in relays 307, 329 and 331 being restored, in sequence. However, as hereinbefore described, the closure of the repeater to the open station line conductors such as 507 and 508 causes differential relay 338 to operate and in turn operates relay 351. Relay 351 upon operating, provides a locking path for relay 308 which was previously operated by slow-to-release relay 331 so that the release of relay 331 at this time leaves relay 308 operated. Since relay 352 operates from relay 351 the cord lamp at the exchange office switchboard lights as an indication that ringing may proceed.

*Exchange office operator rings on trunk*

When the exchange office operator rings momentarily, the end of the ringing period leaves relays 354 and 356 operated and ringing guard lamp 515 lighted as hereinbefore described for an incoming call.

In this case relay 1029 also operates at the beginning of the ringing period in a circuit traceable from grounded battery through the winding of relay 1029, conductor 1030, outer left spring member and operated contact of key 527, conductor 529, front contact and inner upper armature of relay 356, inner upper armature of relay 351, to ground. Relay 1029 is sufficiently high in resistance to prevent relay 354 from operating at the beginning of the ringing pulse initiated by the exchange operator.

Relay 1029, upon operating, causes relay 1028 to operate over an obvious circuit. Relay 1028 locks through its upper winding to ground at relay 1026 which is in an operated condition at this time. The ground at the upper armature of relay 1026 is connected in a circuit traceable over the front contact and upper armature of relay 1028, conductor 1031, inner left spring member and operated contact of key 527, conductor 530, through the winding of relay 352 to grounded battery. The circuit just traced serves the purpose of holding relay 352 operated until the subscriber at called station B answers. Relay 1028, upon operating, also completes a circuit for operating ringing guard lamp 622.

The satellite attendant upon hearing the momentary audible signal produced by buzzer relay 604, notes the lighted guard lamps and rings both stations A and B by operating momentarily keys 511 and 621. These keys, when operated, respectively connect ground to conductors 529 and 1030 which has no effect at this time. Each key also connects ringing current source 611 to the ringer 517 at station A and ringer 705 at station B causing the bells to ring.

When the subscriber at station A answers by operating start switch 518, polar relay 346, closes its right-hand, or mark, contact and differential relay 338 releases thereby releasing relay 351 which in turn releases relays 354, 356 and 1029. Relay 352 does not release since it is also held operated in a circuit extending from relays 1026 and 1028 over conductors 1031 and 530. Relay 351, upon releasing, opens the operating circuit for ringing guard lamp 515 which consequently is extinguished.

When station B answers, differential relay 1024 releases thereby releasing relay 1026 and in turn relay 1028 and extinguishes the ringing guard lamp 622. Relay 1026, upon releasing, also opens the operating circuit of slow-to-release relay 1027 and closes a circuit at its lower armature and back contact to operate relay 1014. Relay 1014 operates and closes at its lower armature and back contact, a locking circuit for itself before relay 1027 eventually releases. Relay 1014, upon operating, extends the ringing side, that is, conductor 703, of the loop circuit of station B, over the right-hand spring members of key 701, 713, 815, 814, 810, conductor 813, and 623, through the winding of relay 1024, upper armature and front contact of relay 1014, through the upper windings, in series of polar relays 1015 and 1016.

Relay 1026, upon releasing, disconnects at its upper armature and upper front contact, ground from the operating circuit for relay 352 and if the subscriber at station A has previously answered as was assumed, relay 352 will therefore release, closing through the telegraph transmission paths to the switchboard at the distant exchange office. This extinguishes the operator's cord supervisory lamp at the exchange office switchboard. The subscribers at stations A and B and the operator at the exchange office are now in communication.

The subscriber at the calling station A may recall the operator in the distant exchange office in the manner previously described herein, provided the called station has not disconnected. If the called station disconnects first, the operator at the exchange office receives no signal but the calling station teletypewriter runs "open."

When the subscriber at the called station B disconnects, polar relays 1016 and 1015 operate through their right-hand positions, the former opening the loop of the calling station A thus causing polar relays 346 and 326 to move their armatures to their left, or spacing, contacts. When the subscriber at the calling station A disconnects before or after the subscriber at the called station B, differential relay 338 operates and the sequence of events previously described for an incoming call occurs except that the satellite attendant upon noting the operated visual disconnect signal 523 must restore both keys 701 and 527 before the visual signal becomes normal.

Key 527, upon being released, opens the operating path of relays 1024, 512, and 1010 which release. Relay 512, upon releasing, dissociates the extension trunk 1000 from trunk No. 1. Relay 1010, upon releasing, restores relay 1014 to normal and completes a path at its inner lower armature and back contact extending from grounded battery through the relay 603, contact and right-hand spring of key 602, conductor 1009, inner lower armature and back contact of relay 1010, conductor 1032, through the winding of the visual drop signal relay 624, conductor 625, contact and outer left-hand spring member of key 810 to ground. The visual drop signal relay remains operated until the station extension trunk key 810 is restored to normal at which time the audible signal controlled by operated relay 603 will be silenced if no other calls are awaiting attention.

*Calling an unattended station*

Unattended station circuits, well known in the art, are arranged so that a prolonged ringing period (about nine seconds) is effective in automatically operating the station power connecting relay thus starting the teletypewriter motor and connecting the station to the loop circui. When the called station served by the satellite switching center is of this type and fails to answer the regular ring, the calling station subscriber may indicate to the exchange office operator that he wishes to send "unattended" in which case the exchange office operator will recall the satellite attendant in the manner hereinbefore described and types "ring unattended." The satellite attendant after restoring the answer key will operate the ring key, such as key 511 in trunk No. 1 and hold it operated. This will cause the ringing guard lamp 622 to immediately light as hereinbefore described. After an interval of about nine seconds, the called station will be automatically connected to the line in which case differential relay 338 will release causing relay 351 to release and extinguish lamp 515. The satellite attendant upon noting this, will release the ringing key such as 511. Relay 351, upon releasing, causes the release of relay 352. Relay 352, upon releasing, closes trunk conductors 301 and 302 through for transmission. The exchange operator's cord lamp is extinguished notifying the operator that communication with the called station may proceed. An unattended station circuit is shown in conjunction with the subscriber's set at station A. A similar circuit may be shown at station B. For a complete description of an unattended station circuit, reference may be made to U. S. Patent 2,031,934 granted to T. L. Corwin on February 25, 1936.

*Called station line busy*

When the satellite attendant receives an order on an incoming call for a station which is found to be busy, she will hold key 816 operated for about two seconds after which the answering key is restored. This connects a source 950 of interruptions to the attendant's teletypewriter and therefore, to the trunk which causes the letter K, for example, to be repeatedly typed on the operator's teletypewriter at the distant exchange office. Ground at key 816, in an operated position, causes relay 908 to operate over an obvious circuit. Relay 908, upon operating, closes at its outer lower armature and contacts an operating circuit for relay 912 which is of the slow-to-release type. Relay 912, upon operating, closes an obvious operating circuit for relay 913 which operates. Relay 908, upon operating, connects at its inner lower and its upper lower armature and respective front contacts, the right-hand contact of relay 914 in series with the attendant's teletypewriter. Polarized relays 914 and 918 function to generate a source of timed interruptions which will now be described. Polar relay 913, upon operating, closes a circuit extending from ground at its lower armature and front contact, conductors 915 and 916 over two parallel paths, one extending through condenser 917 and the upper winding of relay 918 and the other through resistance 919 and 920 and the lower winding of relay 918, resistance 921, conductor NEG to motor generator set Minus. Another path also extends from a tap between resistances 919 and 920 through resistance 922 to conductor NEG. The current flowing through the lower winding of relay 918 tends to operate the relay armature to its right-hand contact and that flowing in the upper winding of the relay tends to hold the relay on the left-hand contact as shown. When the charging current, flowing through the upper winding of relay 918, decreases sufficiently, the armature of the relay moves to its right-hand contact under the control of the current flowing in the lower winding of the relay. As soon as the armature of relay 918 closes to its right-hand contacts, the current in the lower winding is reversed, tending to drive the armature to its left-hand contact. The charge on condenser 917, however, causes a current flow through the secondary winding of relay 918 in a direction tending to hold the armature of relay 918 on its right-hand contacts. When the discharge current on condenser 917 is sufficiently dissipated, the armature of relay 918 is driven to its left-hand contact under the influence of the reversed current in the lower winding. When the right-hand contact is opened, the reversed current in the lower winding of relay 918 ceases and the current through the upper winding and the operating current through the lower winding again begins to flow causing a repetition of the complete cycle. Relay 918 therefore operates and releases at a rate of about nine cycles per second.

Relay 914 which is normally held in its right-hand position as shown under the influence of the current flowing in its upper winding, receives a greatly increased current in the lower winding every time that the left-hand contact of relay 918 is opened. The increased current is a result of the charging of condenser 917 and is of sufficient value to drive the armature of relay 914 to its left-hand contact. When this charging current has decreased to a sufficiently small value, relay 914 moves its armature back to its right-hand contact. The armature of relay 914 remains on its left-hand contact for approximately .022 of a second, thus as a result of the action of relays 918 and 914, a pulse of about .022 of a second occurring nine times a second is produced. This signal is correctly timed to produce a series of "K" signals on the exchange office operator's teletypewriter.

*All trunks busy*

In the event of all trunks being busy when a subscriber served by the satellite attendant desires to originate a call, the satellite attendant will hold operated the key associated with the calling subscriber's station, for example, either key 614 associated with station A or key 817 associated with station B. The key operated in this case transfers the station line conductors to the afore-mentioned source of timed interruptions in a circuit traceable from motor generator set Plus, conductor POS, battery tap resistance 923, through the winding of relay 924, back contact and upper armature of relay 908, armature and right-hand contact of relay 914 shunted by upper back contact on relay 913, inner lower armature and back contact of relay 908, conductor 924, operated contact and right-hand spring member of either of keys 817 or 614 depending on the subscriber's station at which the call originated, normally closed contacts and their respectively right-hand spring members of all the keys in series, over the station line conductors, back through the inner left-hand spring member and normally closed contact of each of the keys associated with the calling station, left-hand spring member and operated contact of either of keys 817 or 614, conductors 818, and NEG to motor generator set Minus. Relay 924 upon operating causes relays 912 and 913 to operate, in turn. Relay 912, upon operating, also prevents from stopping the motor generator sets which were started by the operation of relay 1002 when the station loop was first closed. Relay 912 is made slow-to-release so that it will remain operated if relay 924 follows the generation of the timed signals.

*Remote control of the motor generator sets*

It was shown that conductor 1001 which is connected to conductors 323, was grounded in each trunk when the operator at the exchange office plugged in and rang and also when any station subscriber originated a call causing relay 1001 to operate. Ground on conductor 1001 through the winding of slow-to-release relay 1002 causes the relay to operate and thereby, in turn, operating relays 1004 and 1003. Relay 1003 upon operating connects the commercial source of electric power to motor generator sets Plus and Minus. These sets respectively provide a secondary source of positive and negative telegraph voltage which is impressed on conductors POS and NEG. Relay 1004 is a dash-pot or other type of relay whose operating time is not less than the time for the motor generator sets to reach normal speed. When relay 1004 eventually operates it connects ground to lead 1006. When the demand for power ceases ground is removed from conductor 1001 thereby causing relays 1002, 1003 and 1004 to release whereby the motor generator sets are stopped.

*Remote control of the attendant's teletypewriter at the satellite switching center*

It was shown that conductor 320 was grounded in a truunk on an incoming trunk call. This ground causes relay 901 to operate and connects a commercial source of power to the attendant's teletypewriter motor 902 which starts and continues to run as long as lead 320 is grounded. Relay 901 also energizes printer magnet 910 and the biasing winding of polar relay 905 over an obvious path. A key 903 permits the teletypewriter to be started manually when testing the station lines as hereinafter described and key 907 when operated permits the use of the sending keyboard contacts 925 and break key 926.

OPERATION OF MISCELLANEOUS FEATURES

*Immediate ringing by satellite attendant*

In many cases the operator at the exchange office may, when typing the order for a connection, add the word "ring" to indicate that the called subscriber's station is to be rung immediately. In this event the attendant at the satellite switching center after setting up the connection and restoring the answer key as described for an incoming call, will immediately operate ringing key such as key 511 associated with trunk No. 1. This will ring the bell, or ringer, at the called subscriber's station as hereinbefore described and will also cause the ringing guard lamp such as lamp 515 associated with trunk No. 1 and lamp 622 associated with the extension trunk to light as though the operator at the exchange office had rung. Ground connected to the right-hand spring member and operated contact of ring key such as key 511 is connected in a circuit extending over conductor 529, through the windings, in series, of relays 354 and 356 to grounded battery. Relays 354 and 356 operate causing relay 308 to release, and ringing guard lamp 515 to light as previously described. If a local connection has been set up ground at ring key 511 is extended through the operated contact and outer left hand spring member of the key jointly connected to the incoming trunk on which the call originated and the subscriber's line at which ringing is desired. For example assume the connection is extended over the operated contact and outer left-hand spring member of key 527, and over conductor 1030 through the winding of relay 1029 which operates and operates relay 1028. Relay 1028 upon operating causes the lighting of ringing guard lamp 622 as hereinbefore described. Similarly on a local connection it can be seen that the ground on the right-hand spring member and operated contact of ring key 621 will also cause both ringing guard lamps to light. This feature makes it impossible for the attendant to ring one station and forget to ring the other.

TESTING FEATURE

For maintenance and test purposes means are provided whereby a maintenance attendant may use the teletypewriter at the satellite switching center as a station and originate and receive test calls over each trunk to the exchange office and simulate a second station receiving a local call over the extension trunk combined with any exchange office trunk. The maintenance attendant may also use the satellite teletypewriter in conjunction with the extension trunk to originate and receive test calls with any subscriber station at the time a repairman visits such a station.

To use the teletypewriter 900 for these purposes, keys 907 and 903 are operated. Key 907, in an operated position, removes the shunt path around the sending contacts 925 and break key 926 so that keyboard sending will be possible. Key 903, in an operated position, performs the following function: (a) operates relay 901 which turns on the teletypewriter motor; (b) operates relay 1002 which turns on the motor generator sets; and (c) lights test guard lamp 820. Lamp 820 is also caused to light when certain other test keys are operated. Since such test keys are inaccessible to the satellite operator because of their location inside of the cordless switchboard, the lamp, which is located on the front of the switchboard, serves to remind the maintenance attendant to restore such keys before leaving the switchboard.

TESTING WITH A SUBSCRIBER STATION

Assuming that the extension trunk 1000 is available, the maintenance attendant having operated keys 907 and 903 for the purpose hereinbefore stated, will operate the station key which associates the desired station with the extension trunk, such as key 615 for station A or key 810 for station B. The maintenance attendant then operates key 608 which causes relay 1010 to operate over a circuit extending from grounded battery at the outer right-hand spring member and contact of key 608, break contact and inner right spring member of key 821 and the corresponding break contacts and spring members of keys 822, 531 and 527, conductor 1011 through the winding of relay 1010 to ground. Relay 1010 energizes the extension trunk repeater as hereinbefore described. Ringing key 621 is then operated momentarily leaving lamp 622 lighted. These operations cause the station line conductor to be connected to the extension trunk and the station bell at the station to ring in a manner hereinbefore described for a local call.

Key 608, upon being operated, also connects the satellite typewriter in series with the winding of polar relay 1017 in the following circuit: conductors POS and 1035, inner left make contact and inner left spring member of key 608, conductor 805, break contact and inner right spring member of key 801, conductor 909, make-before-break contact of relay 908, through the upper winding of polarized relay 905 transmitting contacts 925, break key 926, conductor 804, left-hand spring member and break contact of key 801, conductor 609, right-hand spring member and make contact of key 608, conductor 630, armature and contact of relay 631, the corresponding armatures and contacts of relays 632, 532 and 512, conductor 1022, through the upper winding of polarized relay 1017, armature and left-hand contact of polarized relay 1016, conductor 1023, contact and inner right armature of relay 512 and the corresponding contacts and armatures of relays 532, 632, 631, conductor 633, to conductor NEG. Key 608, upon being operated, also closes a circuit extending from grounded battery, ringing guard lamp 622, conductor 634, outer left spring member and make contact of key 608, conductor 635, contacts and upper armature of relay 1026 to ground. Ringing guard lamp 622 lights for a purpose to be described hereinafter.

When the station answers, the ringing guard lamp 622 will be extinguished. A two-way teletypewriter communication is established through the extension trunk repeater as previously described for a local call, except that now the satellite teletypewriter, instead of a trunk is connected to one side of the repeater. The momentary release of the station connecting key 615 at this time will check the operation of the associated line drop signal relay 618 over a circuit path hereinbefore described under the caption "Station originates a call." A check of a recall signal may be made due to the closure of the left-hand spring member and contact of key 608 as hereinbefore mentioned when the recalled key at the station is operated causing differential relay 1024 to operate and in turn operate relay 1026, the ringing guard lamp 622 lighting over the circuit just traced. When the recalled key is restored, the relays will release and extinguish the lamp. Also when the station disconnects, relays 1010 and 1026 again operate to light the lamp but in this case the teletypewriter runs "open." When the station key 615 is restored, relays 1010 and 1026 release and cause lamp 622 to be extinguished. The release of key 608 will leave the extension trunk normal.

ORIGINATING AND OUTWARD TEST CALL ON A TRUNK

To originate a test call on a trunk, in addition to operating keys 907 and 903 on teletypewriter 900 with the result hereinbefore mentioned, the maintenance attendant will operate key 801 to its lower cam position and key 714 to its middle position. Both keys are thus off-normal and cause test guard lamp 820 to light. If the test call is to be made on trunk No. 1, key 715 will also be operated. Key 715, when operated, associates the trunk repeater loop conductors 509 and 510 with the teletypewriter 900 and connects ground to conductor 514 in the same manner as when station key 506 associated the trunk with station A. The circuit thus closed extends from conductor 509 of the loop side of the repeater for trunk No. 1, make contact and inner left spring member of key 715, resistance 716, break contact and lower left spring member of key 714 in its middle position, make contact and upper inner left-hand spring member of key 714, conductor 717, resistance 823, upper left-hand spring member and make contact of key 801 in its lower position, make contact and lower left-hand spring member of key 801, conductor 804, break key 926, transmitting contacts 925 through the upper winding of polarized relay 905, make-before-break contacts of relay 908, conductor 909, lower inner right-hand spring member and make contact of key 801, conductor 824, normal break contacts of recall key 825, resistance 826, upper right-hand spring member and make contact of key 714, lower right-hand spring member and break contact of key 714, resistance 718, right-hand spring member and make contact of key 715, conductor 510 of the loop side of the repeater of trunk No. 1. Resistances 716, 718, 823 and 826 are each equal to one-quarter of the maximum resistance value of the station loop. The operation of key 827 will provide a leak circuit to simulate the actual condition of a station line during transmission.

When the exchange office operator answers, she will upon request complete the call to the test board at that office. The test board attendant may then obtain direct access to the trunk appearing, causing the operator to disconnect the completing cord, and she may then check the operation of the trunk with the maintenance attendant at the satellite switching center. The operation of key 825 will send a recall signal.

The teletypewriter 900 may be released for regular traffic at any time during a test by moving the cam of key 801 to its middle position which replaces the teletypewriter loop by resistance 828. The test station may disconnect while restoring key 801 to its uppermost, or normal, position and retire the resulting operation of the trunk supervisory drop signal 523 by restoring key 715.

TERMINATING AN INWARD TEST CALL

The test board attendant at the exchange office, having received the disconnect signal, now originates a call to the satellite switching center for test purposes. This is handled as described for an incoming call but the trunk in this case is connected to the test station by operating key 715. When the ring key 511 is operated, the ringer 829 will give an audible signal and the operation of key 801 to its middle cam position or its lowermost cam position will cause either resistance 828 or teletypewriter 900 to be connected across the loop conductors 509 and 510 as hereinbefore described. The test may now be continued to include a second test station appearing over the extension trunk. Key 714 is operated to its lowermost cam position which causes resistances 719 (equal in value to resistances 823 and 826 and the teletypewriter 900) to be bridged across the loop conductors 509 and 510 and extends the teletypewriter conductor over an obvious path to the lower springs of key 830 which is shown cammed in its normal position. Key 801 is restored to its uppermost, or normal, position and key 830 is operated to its middle position.

The extension trunk is associated with trunk No. 1 by operating key 527 and is connected to the test station by operating key 715. The operation is the same as hereinbefore described for completing a local call.

The operation of extension trunk ring key 621 will cause ringer 829 to give an audible signal and will light ring guard lamp 622. The operation of key 801 through its lowermost cam position will extinguish the ringing guard lamp 622 and will place the teletypewriter 900 into communication with the test board attendant as hereinbefore described, but in this case the transmission is over the extension trunk. The operation at this time of key 830 to its lowermost cam position will substitute resistance 831 in place of the teletypewriter 900 and the subsequent operation of key 714 to its middle cam position to connect the teletypewriter 900 to the loop conductors 509 and 510 of trunk No. 1.

The release of keys 830 and 714 will simulate a disconnect of the called test station and the calling test station respectively. The restoration of trunk No. 1 and the extension trunk is accomplished as hereinbefore described for a local call except that in this case keys 715 and 832 are the station keys restored. The release of keys 801, 907, and 905 extinguish the test guard lamp 802 and leaves the satellite cordless switchboard in the normal operating condition.

What is claimed is:

1. A communication system comprising a plurality of trunk circuits, a plurality of line circuits, and a group of operable switching means in engageable relation with each of said trunk circuits, said means in each of said groups having other means respectively arranged, when operated to engage one of said trunk circuits, to condition said one trunk circuit whereby a call may be established, to condition said one trunk circuit whereby a call may be answered, to condition said one trunk circuit for a communication connection between a plurality of said line circuits, and to condition said one trunk circuit for testing purposes.

2. A telegraph switching system comprising a central office, a switching center, a plurality of stations, a plurality of trunks circuits interconnecting said central office and said switching center, a plurality of line circuits respectively connecting said stations with said switching center, a plurality of groups of operable keys of said switching center, said keys of each of said groups having means respectively arranged when operated to interconnect one of said main circuits and one of said other circuits to condition said one main circuit whereby a call may be established, to condition said one main circuit whereby a call may be answered, to condition said one main circuit for communication connection between a plurality of said other stations and to condition one main circuit for testing purposes.

3. A telegraph switching system comprising a central office, a switching center, a plurality of stations, a plurality of trunk circuits interconnecting said central office and said switching center, a plurality of line circuits respectively connecting said stations with said switching center, an extension trunk circuit common to said plurality of trunk circuits and said plurality of said line circuits, a plurality of groups of operable keys at said switching center, one of said keys of each of said groups having means arranged, when operated, to engage said extension trunk circuit, and other operable keys individual to said line circuits arranged when operated to complete a connection of said extension trunk circuit to each of any two line circuits for communication purposes.

4. A telegraph switching system comprising a central office, a switching center, a plurality of stations, a plurality of trunk circuits interconnecting said central office and said switching center, a plurality of line circuits respectively connecting said stations with said switching center, an extension circuit common to said plurality of trunk circuits and said plurality of line circuits, a plurality of groups of operable keys at said switching center, one of said keys at each of said groups having means arranged, when operated, to condition said extension trunk circuit, and other operable keys individual to said line circuits arranged, when operated, to complete a connection of said extension trunk circuit to each of any two line circuits for communication purposes, and equipment at said switching center for testing transmission over any one of said trunk circuits direct, over any one of said trunk circuits when engaged with said extension circuit, over any one of said line circuits direct and over any one of said line circuits when engaged with said extension circuit.

5. A teletypewriter switching system comprising a central office, a switching center, a plurality of stations, a plurality of trunk circuits interconnecting said central office and said switching center, a plurality of line circuits respectively connecting said station with said switching center, a plurality of groups of operable keys at said switching center, one of said keys at each of said groups having means arranged, when operated, to interconnect one of said line circuits and one of said trunk circuits, a single operable key at said switching center, a source of current interruptions controlled by said single key, when operated for a predetermined interval for sending over any one of said trunk circuits signal information that a desired line circuit of said plurality is busy, and a plurality of other keys at said switching center said other keys being individual to said line circuits and arranged to transmit over their respective line circuits, current interruptions from said source when all of said trunk circuits are busy.

6. A telegraph switching system comprising a central office, a switching center, a plurality of trunk circuits interconnecting said central office and said switching center, a plurality of subscriber's stations, a plurality of line circuits respectively connecting said subscriber's stations to said switching center, switching means arranged in groups at said switching center, each switching means of each of said groups being arranged to connect a different one of said trunk circuits to one of said line circuits, an extension trunk circuit common to said trunk circuits for interconnecting any two of said line circuits and any one of said trunk circuits for supervisory purposes, and means in said central office for signaling the attendant at said switching center when said extension trunk is conditioned to connect any two of said line circuits together for communication purposes, and means at said switching center for completing the connection between said two line circuits over said extension circuit.

7. In a telegraph switching system, according to claim 6, wherein said switching center includes separate means for testing each of said trunk circuits individually, each of said trunk circuits in conjunction with said extension trunk circuit, and each of said line circuits in conjunction with said extension trunk circuit.

ALLEN R. BONORDEN.